United States Patent
Leonard et al.

(10) Patent No.: US 7,149,893 B1
(45) Date of Patent: Dec. 12, 2006

(54) SYSTEM AND METHOD FOR ENABLING THE ORIGINATOR OF AN ELECTRONIC MAIL MESSAGE TO PRESET AN EXPIRATION TIME, DATE, AND/OR EVENT, AND TO CONTROL PROCESSING OR HANDLING BY A RECIPIENT

(75) Inventors: Jon N. Leonard, Tucson, AZ (US); Charles H. Seaman, Richmond, CA (US); Michael Anderer, Salt Lake City, UT (US); Peter B. Ritz, Meadowbrook, PA (US); Michael Bernstein, Tucson, AZ (US); Robert J. Schena, Wayne, PA (US)

(73) Assignee: Poofaway.com, Inc., Tucson, AZ (US)

( * ) Notice: Subject to any disclaimer, the term of this patent is extended or adjusted under 35 U.S.C. 154(b) by 0 days.

(21) Appl. No.: 09/390,363

(22) Filed: Sep. 7, 1999

(51) Int. Cl.
*H04L 9/00* (2006.01)
(52) U.S. Cl. .................. 713/154; 726/26; 709/206; 709/207; 709/217
(58) Field of Classification Search ............. 713/161, 713/167, 170, 178, 189, 191, 154, 176, 160, 713/155, 201; 709/217, 206, 207, 229; 705/51, 55; 726/26
See application file for complete search history.

(56) References Cited

U.S. PATENT DOCUMENTS

| | | |
|---|---|---|
| 5,014,234 A | 5/1991 | Edwards, Jr. |
| 5,125,075 A | 6/1992 | Goodale et al. |
| 5,325,310 A | 6/1994 | Johnson et al. |
| 5,598,279 A | 1/1997 | Ishii et al. |
| 5,764,898 A | 6/1998 | Tsuji et al. |
| 5,790,790 A | 8/1998 | Smith et al. |
| 5,862,325 A | 1/1999 | Reed et al. |
| 5,870,548 A | 2/1999 | Nielsen |
| 5,872,925 A | 2/1999 | Han |
| 5,877,755 A | 3/1999 | Hellhake |
| 5,878,230 A | 3/1999 | Weber et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |

(Continued)

OTHER PUBLICATIONS

Powell, B., *Disappearing Inc. makes email go away for good*, Red Herring, p. 62, Nov. 1999.

*Primary Examiner*—Hosuk Song
*Assistant Examiner*—Beemnet W Dada
(74) *Attorney, Agent, or Firm*—Bacon & Thomas, PLLC

(57) ABSTRACT

An electronic mail system and method enables the originator of a message sent by electronic mail to select a date, time, or event at which the message and all incarnations of the message to self-destruct, regardless of the number and types of computers or software systems that may have interacted with the message. The system and message also permits the originator to include processing and handling limitations. The necessary control over the message is achieved by encrypting the message and enabling viewing only through a viewer applet arranged to facilitate destruction of the message upon the occurrence of the selected expiration time, date, or event, and to implemented the handling and processing limitations. A central server can be used to exercise additional control over the message by serving as a proxy destination, and by streaming the encrypted message to the viewer applet. The viewer applet can be transmitted to new recipients with the message so that the system and method can direct mail to any electronic mail user.

47 Claims, 11 Drawing Sheets

U.S. PATENT DOCUMENTS

| | | |
|---|---|---|
| 5,920,861 A | 7/1999 | Hall et al. |
| 5,951,636 A | 9/1999 | Zerber |
| 5,958,005 A | 9/1999 | Thorne et al. |
| 6,285,991 B1 * | 9/2001 | Powar ................... 705/76 |
| 6,324,569 B1 * | 11/2001 | Ogilvie et al. ........... 709/206 |
| 6,442,600 B1 * | 8/2002 | Anderson ............... 709/217 |
| 6,487,586 B1 * | 11/2002 | Ogilvie et al. ........... 709/206 |
| 6,601,088 B1 * | 7/2003 | Kelley et al. ............ 709/206 |
| 6,625,734 B1 * | 9/2003 | Marvit et al. ............ 713/201 |
| 6,721,784 B1 * | 4/2004 | Leonard et al. .......... 709/206 |
| 6,728,714 B1 * | 4/2004 | Doganata et al. .......... 707/10 |
| 2003/0126215 A1 * | 7/2003 | Udell et al. ............. 709/206 |

* cited by examiner

SYSTEM AND METHOD FOR ENABLING THE ORIGINATOR OF AN ELECTRONIC MAIL MESSAGE TO PRESET AN EXPIRATION TIME, DATE, AND/OR EVENT, AND TO CONTROL PROCESSING OR HANDLING BY A RECIPIENT

BACKGROUND OF THE INVENTION

1. Field of the Invention

This invention relates to a system and method for permitting the originator of a message sent by electronic mail or an analogous system, including messages sent over an open network, to cause the message and all incarnations of the message (or at least incarnations of the message selected by the originator) to self-destruct at a desired date and/or time, or upon the occurrent of a predetermined event, regardless of the number and types of computers or software systems that may have interacted with the message.

In order to enable all or selected incarnations of the message to self-destruct, the preferred embodiments of the invention provide a level of control over electronic mail that also enables the originator to limit an electronic mail recipient's processing and handling rights. Although limitation of processing and handling rights is not essential to the general concept of causing all or selected incarnations of a message to self-destruct, i.e., to the concept of predetermining when an electronic mail message will expire, and although limitation of certain processing and handling rights apart from the concept of electronic mail message expiration is known, the invention also relates to the manner in which limitation in the processing and handling rights is achieved, which is a by-product of the level of control necessary to achieve expiration of the message and all its incarnations.

Finally, the invention also relates to electronic mail origination and viewer software that implements the electronic mail self-destruct system and method of the invention, and to a method for distributing electronic mail origination and viewer software in order to establish a controlled access electronic mail system.

2. Description of Related Art

The following description of "related art" begins with a general description of the properties of electronic mail that serve to define the context of the invention, followed by a discussion of a prior art system that purports to provide a framework for controlling distribution of electronic documents in general, known as the "virtual distribution environment" (VDE) and disclosed in U.S. Pat. Nos. 5,892,900, 5,910,987, 5,915,019, and 5,917,912. The third section of this description of related art describes systems specific to electronic mail and that provide controls of such processing or handling functions as forwarding and reply, while the fourth section describes a system, disclosed in U.S. Pat. No. 5,870,548, that provides for cancellation of electronic mail messages after sending. The fifth section of the description discusses a patent related to delivery of an interactive television program in relation to the feature of the invention involving distribution of the viewer applet that enables control of expiration date and processing functions, and the last section summarizes the differences between the present invention and the prior art.

(i) Definition of "Electronic Mail"

Electronic mail can be defined as a system or method for transmitting electronic data or text files from one computer to another based solely on a destination address without reference to the content of the files or, in general, to the route taken to reach the destination address, and in a form that permits the files to be accessed and manipulated at the destination address at the convenience of the recipient.

Electronic mail defined in this manner can be compared to postal mail, in which letters are routed solely to their destination based on addresses written on envelopes, the content of the messages being hidden in the envelopes, and the envelopes being placed in a mailbox for later retrieval at the convenience of the addressee.

Those skilled in the art will appreciate that the above definition is not the only possible definition of electronic mail, and that the invention is therefore not necessarily to be limited by this definition. Instead, the definition is intended as an aid to understanding the manner in which the invention differs from other types of systems and methods which might, like the present invention, provide for sender controls and a limited lifespan for the transferred files, but do not have the above characteristics of electronic mail. Examples of conventional file or data transfer systems that do not fall within the definition of electronic mail, but in which control of information is retained by the originator or sender, include video pay-per-view systems that rely on signal scrambling and the use of converter "boxes" to unscramble the signal and permit viewing of a video when payment has been received, and shareware or demonstration software downloads that self-destruct after a trial period if the shareware is not registered.

The "convenience of the recipient" aspect of the definition is important because it distinguishes electronic mail from real time electronic data transfers such as the file transfer protocol (FTP), and implies that electronic mail files must be stored somewhere and directly accessible at least once by the recipient at some time following receipt. It is this storage that gives rise to the problem addressed by the present invention, namely the extended life of an electronic mail message. While storage is an essential aspect of electronic mail, however, it will be appreciated that the files do not need to be stored in plain text form, and that the local storage need not be on the recipient's computer or even on a network server such as an IMAP server.

Another important aspect of the definition of electronic mail is that the files transferred are data or text files that contain information, rather than executable programs. It is a trivial matter to program self-destruction into an executable program, but a data or text file cannot be delete without the aid of an external program, which in conventional electronic mail systems is entirely under the control of the recipient.

A third important aspect of the definition of electronic mail is that the electronic mail messages are relayed through a network of intermediate hubs based solely on the destination address, much as envelopes are handled by a conventional postal mail delivery system. The contents of an electronic mail object do not affect its ability to be delivered anymore than does the content of an envelope, and thus the data fields or contents of an electronic mail object can be formatted in any desired manner (with the exception of certain fields reserved for the writing of routing or tracking information that can be used for debugging). In particular, it is possible to insert flags that cause actions to be performed at the receiving end of the transmission, and that are unique to the sending and receiving software, without requiring new data structures or substantive revision of the conventional electronic mail protocols, and without affecting the transmission. In the case of Simple Mail Transfer Protocol (SMTP) transmission, these flags can be included as extensions of the destination address permitted by SMTP, or as an internal message header that is treated by SMTP as text or data and that is recognized only by the receiving software.

The broad definition of electronic mail given above can be implemented in numerous ways, and the present invention is intended to apply to all such implementations. The most common implementation is currently SMTP, which determines how electronic mail objects are routed to a destination address, and its related protocols, the Post Office Protocol (POP) or Internet Mail Access Protocol (IMAP), which set up "mailboxes" at the destination address, either locally or on a mail server, following transmission by SMTP. The invention is of course explicitly applicable to electronic mail sent via SMTP. In addition, messaging systems such as Lotus Notes™ may be considered to be within the definition of electronic mail for purposes of the invention.

(ii) "Virtual Distribution Environments" and the Concept of Control

In order to limit the lifespan of a message, it is necessary to exercise some control over the message. The present invention provides such control and, as a result, also offers the possibility of enabling the sender to limit not only the lifespan of the message, but also handling of the message, including forwarding, copying, printing, and so forth.

While providing such control is an important feature of the invention, however, it is not a unique feature. In fact, a system currently exists, at least in the form of a patent specification, which in theory provides all of the control necessary to achieve virtually any desired handling or lifespan limitations on any type of transferred file. The system is known as the Virtual Distribution Environment (VDE) and is disclosed in U.S. Pat. Nos. 5,892,900, 5,910,987, 5,915,019, and 5,917,912, all entitled "System and Methods For Secure Transaction Management and Electronic Rights Protection" (the VDE patents). The problem with VDE as a solution to the problem of message lifespan is that, in addition to not suggesting the concept of enabling the originator of an electronic mail file to control its lifespan, the controls implemented by VDE are too complex to be implementable through conventional mail protocols such as SMTP.

In general, there are three ways that control of a transferred file might be retained by the originator. The first, used for pay-per-view systems, is to prevent any copying or recording of the files, so that the files can only be viewed as they are being broadcast or downloaded. The second, used in the case of executable software downloads, is to include self-destruct instructions in the program instruction set. In the case of non-streaming, non-executable files, however, a third method is required. This is the method used by the presented invention, and is also the method implemented by VDE. In its most general form, this third method of transferred file control involves encryption of the files so that they can only be processed by software designed to implement the desired controls. The software that decrypts the files can be programmed to destroy the files at a desired date or upon the occurrence of a particular event, no matter how often the files have been copied or re-transmitted.

While the system and method described in the VDE patents thus utilizes the same general principle as the present invention, namely retaining control of files distributed over an open network by encrypting the files and utilizing software at the receiving end to exercise control over the files, including destruction of files (mentioned, for example, in col. 169, lines 61 et seq. of U.S. Pat. No. 5,917,912), and even protection of electronic mail (col. 278, lines 58 et seq. of U.S. Pat. No. 5,917,912), the details of the system and methods described in the VDE patents are substantially different than those of the present invention. Instead of utilizing existing communications protocols, VDE requires revision not only of the file origination, transmission, and receiving programs, but also "component, distributed, and event driven operating system technology, and related communications, object container, database, smart agent, smart card, and semiconductor design technologies" (Col. 8, lines 1–7 of U.S. Pat. No. 5,917,912). As a result, even though the VDE can be made to perform virtually any desired control function it is simply not practical in the context of electronic mail.

The impracticality of the systems disclosed in the VDE patents is explained at length in a later patent by the same assignee, U.S. Pat. No. 5,920,861, which compare VDE to a "blank canvas" on which the "master painter" can create his or her masterwork (col. 3, lines 1–12 of U.S. Pat. No. 5,920,861), but which is not suitable for use by the average end user. To solve the ease-of-use and interoperability problems, the later patent proposes to implement the generic template structure of the "virtual distribution environment" by creating a specific machine readable data structure. This solution to the problem is exactly opposite the solution provided by the present invention, which is to provide an applications level program that is completely compatible with existing protocols. This is possible because the present invention, unlike the VDE system, seeks to provide a specific control function, namely the specification of an expiration date for a message, in a specific context, namely electronic mail. It is designed to work within existing communications structures, and in particular within existing SMTP, POP, and IMAP formats, while providing a simple user interface that will be as familiar to the average electronic mail user, and as easy to use, as existing electronic mail programs.

(iii) Control in the Specific Context of Electronic Mail

While the VDE concept provides a framework by which sufficient control of electronic mail could be achieved so as to enable a sender to limit the lifespan of the electronic mail, the VDE system essentially amounts to overkill, and therefore has no practical application to electronic mail as defined above.

On the other hand, those systems described in prior patents that are specifically directed to the concept of enabling originator control of electronic mail messages, for the most part in the context of ensuring that a message will be read or forwarded rather than to limit the lifespan, do not provide for a sufficient level of control, at least of messages sent over an open network, to ensure that all incarnations of a message will in fact be expunged. While it might seem that the advantages of providing sufficient control of electronic mail to ensure that messages can be made to expire at a time, date, or upon the occurrence of an event selected by the originator might have been grasped by designers of the prior systems, there are reasons why the advantages were in fact not apparent to such designers.

First, since electronic mail has been designed to be analogous to postal mail and postal mail has no function analogous to message expiration, except for the use of disappearing ink, it is likely that the concept of enabling the originator of a message to control the expiration and limit use of the message was simply not considered. The expiration of messages has previously been the province solely of fiction, exemplified by the self-destructing tape recorder in the opening scene of the television show Mission Impossible, and not as a way to give any sender of a message control of the lifespan of the message.

Second, the systems and methods disclosed in the prior patents are for the most part intended solely to force a response from the recipient, or facilitate distribution and forwarding of a mass mailing, with no consideration of what happens to the message after the response is made or the message is forwarded, and no provision for limiting either the lifespan or the use of a message once an appropriate response has been made.

For example, U.S. Pat. No. 5,325,310 discloses a system which prevents deletion of an electronic mail message until it has been viewed and/or forwarded, while U.S. Pat. No. 5,878,230 discloses a system designed to force a reply or forwarding, and U.S. Pat. No. 5,125,075 is one of several patents that disclose systems for controlling routing and access to electronic mail "circulars." It is not surprising that systems designed to ensure that an electronic mail message is read and disseminated in a desired manner have not provided for expiration of the messages being disseminated.

The only systems that actually provide for a limited message lifespan are those that automatically delete files after a predetermined period of time in order to clear space on a disk drive. These systems do not provide for originator control of the lifespan of the message, and in particular one that is to be sent over an open network rather than being retained on a local area network server. An example of this type of system is disclosed in U.S. Pat. No. 5,598,279, which describes a local area network server that provides for timed destruction of electronic mail and other files to save space on the server, but without the inclusion of an end-user interface that permits the originator of the electronic mail to select an expiration date, or any controls that would make such an interface possible.

(iv) Cancellation of an Electronic Mail Message—U.S. Pat. No. 5,870,548

The one patent that in a sense involves originator control of the lifespan or expiration of electronic mail messages is U.S. Pat. No. 5,870,548. However, the lifespan control provided by the system disclosed in this patent is in the form of the ability to cancel messages, rather than to select a lifespan prior to sending the message. As with the forwarding or response requiring systems, implementation of the cancellation message is left to the recipient, and no provision is made for dealing with of copies of the original message that have already been forwarded.

U.S. Pat. No. 5,870,548 can be fairly said to represent the current wisdom in the art of electronic mail handling. Basically, the view has generally been that "once the message is submitted to the Internet, it cannot be directly altered, canceled, or retracted by the originating program" (U.S. Pat. No. 5,870,548, col. 1, lines 37–39). The solution proposed in U.S. Pat. No. 5,870,548 is simply to send a follow-up "action message" to the recipient, asking for cancellation. The problem is that by the action message has been sent, the original message might have been copied or forwarded and therefore out of control of the original recipient, even if the recipient were to cooperate and cancel the message.

Even if cancellation of a message sent by the system of U.S. Pat. No. 5,870,548 could be assured, the system described therein does not take into account the possibility that the message might already have been forwarded. Furthermore, while it might be possible to prevent forwarding, and thereby help ensure cancellation, there are numerous reasons why a sender might wish to permit forwarding of a message and yet have all incarnations of the electronic mail message, rather than just the original incarnation, expire at a particular date or time. The message could contain proprietary data for use by vendors, preliminary test results or draft research papers, confidential work product to be shown to groups of clients, or personal medical data that might be forwarded to different specialists, as necessary. The ability to send requests for cancellation of the message after the message has been sent and processed without any restriction is clearly is not an adequate response to such conditions.

(iv) Distribution of Viewer Applets

An important feature of the present invention concerns distribution of the viewer applet that which enables or implements destruction of an e-mail message at a predetermined date, time, or event. The system and method of the invention permits the originator to address the message to any desired recipient equipped to receive electronic mail, whether or not the recipient is in possession of the viewer applet that enables the recipient to read the message. This is accomplished either by first notifying the recipient that an encrypted message has been received and then sending the viewer applet to recipient upon request, by attaching the viewer applet to the message and notifying the recipient so that the message can be immediately installed by the user, or even by causing the viewer applet can even be installed automatically upon opening of the electronic mail in a manner analogous to an electronic mail virus.

U.S. Pat. No. 5,877,755 discloses a somewhat similar arrangement in the context of a interactive broadband multimedia system. In its broadest form, the system of U.S. Pat. No. 5,877,755 provides for transmission to a customer of the executable program file that permits use of the interactive system to the customer, and then having the executable program file request downloading of the multimedia data file.

The present invention extends the concept of supplying executable program files that request data or files (which is also the concept behind "push" applets that plug into a web browser) to electronic mail with dramatic results. Whereas in all prior commercial software distribution systems including the system of U.S. Pat. No. 5,877,755, potential users must be identified and persuaded to initiate contact in order to obtain the executable program files, and so forth, the system and method of the present invention can be propagated primarily by the users themselves without the need for advertisements, central mailing lists, and so forth. Each time a user of the system sends an electronic mail message to a non-user and the non-user chooses to read the message, the non-user becomes a participant in the system. From a marketing and distribution standpoint, the present invention represents an entirely new paradigm.

(v) Summary of Difference Between Invention and Prior Art

In summary, while the advantages of control of the lifespan of electronic mail messages is immediately apparent, none of the prior systems discussed above is intended to provide such control, nor are they suitable for use in providing such control. The system described in the VDE patents, i.e., U.S. Pat. Nos. 5,892,900, 5,910,987, 5,915,019, and 5,917,912, provides a potential general framework by which electronic mail messages could be limited, but the requirement for new data structures, hardware, and programming paradigms makes it unsuitable for practical application to an electronic mail system. In contrast, the electronic mail system and method of the present invention is designed to work within the existing electronic mail protocols, (although it is not limited thereto), at the applications level, without requiring new data structures, hardware, or other security features. Furthermore, while the remaining patents discussed above generally provide for sender control in the specific context of electronic mail processing or handling, they do not offer (and do not need to offer) a level of control sufficient to ensure that the electronic mail message will in fact be expunged at a desired date or time, or upon the occurrence of a preselected event, and thus are also unsuitable for implementing the invention. Finally, unlike centralized digital file distribution systems such as the one disclosed in U.S. Pat. No. 5,877,755, the pre-distribution or simultaneous distribution of the viewer applet with the electronic mail message so that the message can be read by any electronic mail user, the electronic transmission of the applet operating as a key to playing or further distributing the digital content, permits the "infrastructure" necessary to implement the system to be self-propagating and thereby create what is effectively not only a "virtual distribution environment," but a revolution in distribution and marketing that has the potential to do for software, or at least electronic mail software, what Henry Ford did for automobiles or Ray Kroc for hamburgers.

SUMMARY OF THE INVENTION

It is accordingly a first objective of the invention to provide an electronic mail system and method in which the originator or sender may control the lifespan of the message, so that the message, and all copies of the message anywhere in the world, disappear at the appropriate time.

It is a second objective of the invention to provide an electronic mail system and method in which all versions and copies of the message are caused to be erased at a time or date selected by the originator or sender using a simple interface resembling that of a conventional electronic mail client, and that works within a conventional Internet browser program.

It is a third objective of the invention to provide an electronic mail system and method in which all versions and copies of the message are caused to be erased at a time or date selected by the originator or sender, and which requires only a simple viewer that plugs into the recipient's browser and that also includes a simple user interface that resembles a conventional electronic mail viewer interface.

It is a fourth objective of the invention to provide an electronic mail system and method in which all versions and copies of the message are caused to be erased at a time or date selected by the originator or sender, and which also provides sender control of electronic mail processing or handling functions such as forwarding, modification, or printing.

It is a fifth objective of the invention to provide a an electronic mail system and method in which all versions and copies of the message are caused to be erased at a time or date selected by the originator or sender, and yet which does not require the establishment by the originator of a virtual distribution environment or network, the system and method instead being set-up by either using a centralized server to automatically distribute the necessary viewer each time a new client receives a message from the server that can only be read by the viewer, or by including the viewer with message, without the need for potential clients to take any action at all other than, optionally, an indication of desire to receive messages originated by software utilizing the principles of the invention.

It is a sixth objective of the invention to provide software for managing electronic mail that enables the originator of the message to set, at the time that he or she composes the mail a self destruct date and time for that email, such that, upon that date and time, and independent, world wide, of the number and types of computers/software that may eventually interact with the message, the number of people who may eventually receive the message, or the number of handling incidents that may eventually impact the message, the message and all of its incarnations will vanish.

It is a seventh objective of the invention to provide software for managing electronic mail that ensures selective sender control of such processing functions as printing, copying, and forwarding, and yet that is relatively simple to implement and that can be used with existing electronic mail protocols.

It is an eighth objective of the invention to provide various methods for establishing an electronic mail system as described above, and in particular for distributing origination and viewer software, in a rapid and efficient manner, so that senders will be able to utilize the controls provided by the invention with messages sent to a large number of potential recipients.

These objectives are accomplished by providing an electronic mail system and method in which the viewing of the electronic mail message is possible only through a viewer programmed to execute permitted handling and/or processing functions, and which in which only encrypted versions of the electronic mail are permitted to exist. Unlike the "containers" of the virtual distribution environment described in U.S. Pat. Nos. 5,892,900, 5,910,987, 5,915,019, and 5,917,912, the electronic mail packages of the present invention can be sent through existing conventional electronic mail distribution channels over an open network such as the Internet employing standard protocols such as SMTP, and a simple user interface that can be used by any electronic mail user, without the need for enhanced or new data structures. On the other hand, unlike the electronic mail cancellation structure of U.S. Pat. No. 5,870,548, access and handling rights to the message are always retained by the originator of the message.

In general, the invention involves reserving access rights to the electronic mail message by permitting the message to be viewed and manipulated only by a viewer applet responsive to the commands set by the originator of the message. The commands may be transmitted in the form of message attributes included in a header that forms a part of the electronic mail object, and that normally includes such information as the date the message was created, the time that the message was sent, the sender, a title or name of the message, and other information about the document that the recipient may be interested in. Such attributes are commonly referred to as an Interchange Document Profile (IDP). It has previously been known to use space in the IDP to cause a message to be automatically forwarded or resent, or to require a persistent reply, as disclosed for example in U.S. Pat. Nos. 5,878,230 and 5,325,310, but the systems disclosed in these patents cannot be used for purposes of the present invention because they surrender control of the electronic mail to the recipient once the message has been forwarded or replied to.

Those skilled in the art will appreciate that although the invention is designed to enable the originator of a message to set a date, time, or even at which all incarnations of the message will self-destruct, the technology that causes all of the incarnations to be destroyed also permits the originator of the message to cause only some of the incarnations of the message to be destroyed. For example, the originator might wish to permit saving of copies of the message sent to his or her attorneys from the general self-destruction, or the originator might wish to extend the expiration date for certain recipients of the message.

There are currently two preferred embodiments of the invention, although the invention is not intended to be limited to either of the two preferred embodiments. In a first preferred embodiment of the invention, control of expiration and access rights to the electronic mail message is achieved by storing the electronic mail message on a designated central electronic mail server, encrypting the message with a public key generated by viewer software at the receiving end, and streaming the electronic mail message to the recipient whenever viewing is desired by the viewer and permitted by the originator. In a second preferred embodiment of the invention, control of expiration and access rights to the electronic mail message is achieved solely by viewer software installed on the recipient's computer, the electronic mail message being delivered in encrypted form directly to the recipient's viewer software after an exchange of keys, either with a central server providing key exchange functions or through direct peer-to-peer key exchange.

In both of these preferred embodiments of the invention, the encryption system by which message access to the viewer software is limited is preferably a public key/private key cryptosystem. In the first preferred embodiment of the invention, the public/private key pairs include a central server public/private key pair generated by the central server and a viewer public/private key pair generated by the viewer applet, either once or each time a message is to be read, the public key of the central server being used to encrypt the message for transmission from the sender to the central server, and the viewer applet's public key being transmitted from the viewer applet back to the central server for use in encrypting transmissions from the central server to the viewer applet. In the second preferred embodiment of the invention, the viewer applet's public key is preferably sent back to the original sender for use in encrypting the transmission. In addition, it is possible even in the first preferred embodiment to transmit the viewer applet's public key back to the sender to ensure that the message is kept private even from the central server.

In the case where a central electronic mail server is provided, distribution of the viewer applet may be accomplished by downloading the viewer applet from the server upon request from the recipient, or automatically with the electronic mail. Alternatively, the software may be transmitted directly from the originator software to a recipient as an electronic mail attachment without intervention of an electronic mail server, the attachment being self-executing upon opening by the recipient. The viewer applet preferably also includes message origination software, which may optionally be activated either freely or upon payment of a registration or subscription fee, or the message origination software may be provided as an upgrade or separate plug-in program distributed through the usual software distribution channels.

The message origination software preferably has an interface that resembles those of conventional electronic mail programs, but with the addition of buttons that permit setting of an expiration date and, optionally, other handling or processing limitations or rights, such as forwarding limitations or rights, as well as the right to print, and that cause appropriate flags to be toggled or set in the IDP or in a header portion of the electronic mail object.

The electronic mail client may either be an individual computer to which the client has been downloaded, or a computer connected to a POP or IMAP server. In the latter case, the POP or IMAP server will be by-passed during streaming of the message to the client, which can be accomplished simply by using a direct TCP/IP Internet connection to establish the channel through which the message is streamed.

Finally, when the date, time, or event at which message expiration is to occur, the invention provides for triple erasing of the message by the central server, in the case of the first preferred embodiment, or by the viewer applet, in the case of the second preferred embodiment. In addition, in either embodiment but particularly in the case of the second preferred embodiment, the viewer can be arranged to triple erase the private encryption key. If the first preferred embodiment of the invention is utilized, then triple erasing the message will ensure that the sent message is completely expunged from the face of the earth since the central server maintains the only copy of the message. On the other hand, while the second preferred embodiment may not necessarily prevent copies of the encrypted electronic mail object from being made, erasing of the decryption key or setting of the viewer so that it will no longer decrypt the electronic mail object ensures that the "message," as opposed to the mail object, is still effectively expunged from the face of the earth.

DETAILED DESCRIPTION OF THE PREFERRED EMBODIMENTS

Figure 1:
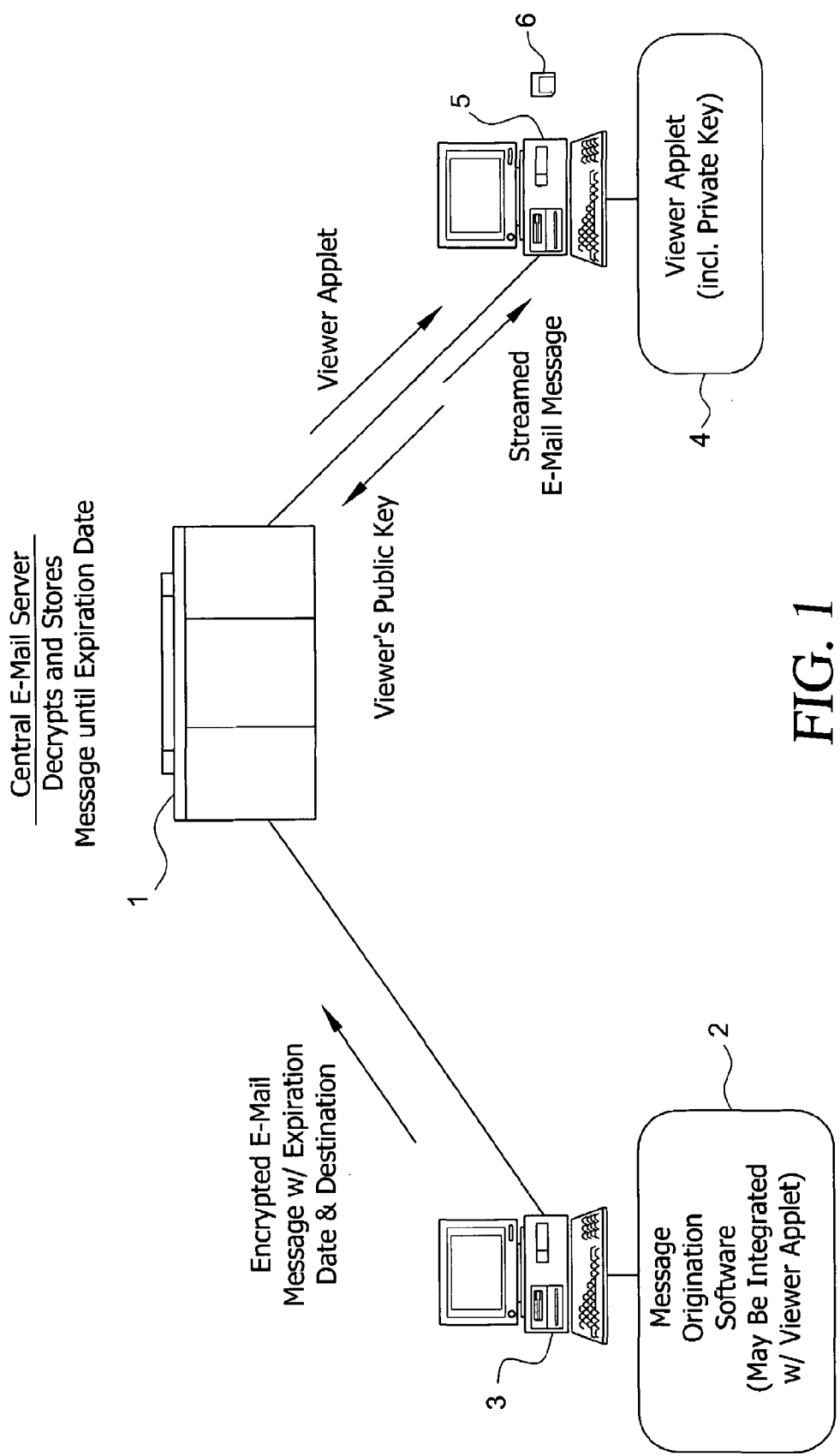
FIG. 1 is a schematic view of an electronic mail system constructed in accordance with the principles of a preferred embodiment of the invention.

As illustrated in FIG. 1, a system constructed in accordance with the principles of a first preferred embodiment of the invention includes an electronic mail server 1, message origination software 2 resident on a sender's computer 3, and a viewer applet 4, which may already be installed in the recipient's computer 5 or supplied by server 1 during delivery of a message. Although illustrated as discrete entities in FIG. 1, the message origination software 2 and viewer applet 4 are preferably integrated into a single program or applet, as will be explained in more detail below.

The basic concept underlying this embodiment of the invention is to control viewing and handling of the electronic mail message by retaining the message on the electronic mail server 1 and requiring the recipient to view the message using the viewer applet 4, which permits only the functions indicated by the originator of the message. Use of the viewer to view the message is ensured by encrypting the message and streaming the message to the viewer applet, with only the viewer applet having the ability to decrypt the message. Since the message is not captured by the viewer software, it exists only on server 1, and therefore erasure of the message from storage associated with the server expunges the one copy of the message in existence. Even if copying of the message were permitted, for example for the purpose of placing the message in different folders or storage areas, all copies of the message would still reside in the server's secure storage area and therefore be subject to deletion at the time, date, or event preset by the message originator. Conversely, control of the message in this manner also enables the originator to designate different expiration dates for different recipients, or even to except certain recipients from the expiration date or other controls.

Figure 2:
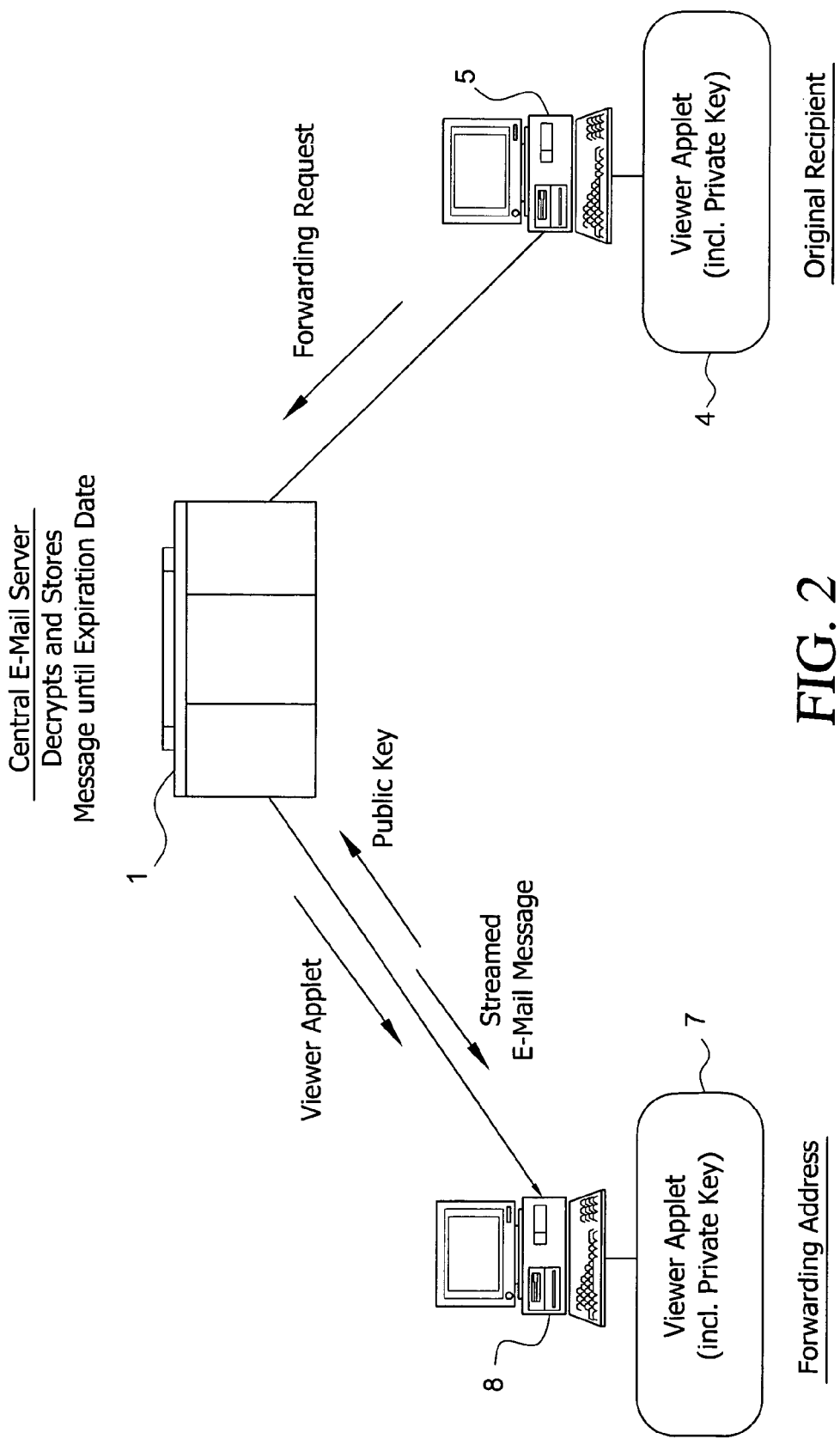
FIG. 2 is a schematic view showing the manner in which a message is forwarded in the electronic mail system of FIG. 1.

As illustrated in FIG. 2, this set-up enables forwarding of the message without surrendering control of the message. A forwarding request from the original recipient is handled in exactly the same manner as a request by the recipient to view the original message, i.e., by notifying the intended recipient of the forwarded message that an electronic mail message has been received, downloading a viewer applet as necessary, and then streaming the message to the installed viewer applet 7 on the forwarded message recipient's computer 8. Although illustrated as a direct connection between the server 1 and the computer 8, those skilled in the art will appreciate that server 1 and computer 8 could be connected to different nodes of the Internet, and that forwarding of the message may involve a second, local central electronic mail server (not shown).

Because the message is stored only at the central server 1, sender control of additional processing or handling functions can easily be provided by designating portions of the original message header as control bits or flags, which are read by the server or directly forwarded to the viewer applet on the recipients computer, and which selectively disable functions provided by the viewer applet 4. For example, forwarding of the message can easily be prevented by the central server 1, without involving the viewer applet 4, by simply having the central refuse forwarding requests. On the other hand, prevention of copying or printing of the streaming download would normally be carried out by disabling (or conversely by not enabling) copy or print functions of the viewer applet 4.

The electronic mail server 1 may be configured to receive and process electronic mail messages using any electronic mail protocol and transmitted over any suitable medium, including media involving such technologies as biochemical or molecular transmission and/or storage that have yet to be implemented. For purposes of the present description, the electronic mail protocol will be assumed to be SMTP, but the invention is not intended to be limited to any particular transfer protocol. In addition, it will be appreciated that any message sent from the message origination software 2 to the server 1 may be routed through a number of different servers (not shown) after initial contact with a local gateway server in the manner of a standard electronic mail message. Under SMTP, the origination software is only responsible for supplying the destination address to the local server, which relays the destination address to other servers using, for example, the DNS registration system of the Internet, and ultimately to the destination, which in this embodiment is the address of server 1. Under certain electronic mail protocols, it is possible to include the server address under routing information, although the SMTP protocol discourages such routing, and thus in the preferred embodiment of the invention the address of the recipient is inserted by the message origination software into the message header rather than as a destination (RCPT) command.

By way of illustration, if the recipient is already a subscriber to the system or has viewer mail installed, the recipient's address will be in the form of <recipient>@<cs>.com, where cs is the domain name of the central server and <recipient> is an address that has been assigned to the recipient. If the recipient does not have an electronic mail address assigned by the system, then the originator software must encode part or all of the original address in the message header following the DATA command, and substitutes an address in the form <..-.>.<cs>.com, where < . . . > can be any local designator convenient for the central server, such as an indicator that the recipient is not a subscriber, or an account number originator. Upon receipt of the electronic mail message, the central server reads the recipient's actual address from the header and uses that address to establish initial communications with the recipient.

Also in the message header, as mentioned above, are fields for including control information used to enable or disable electronic mail processing or handling functions, such as printing, copying, or forwarding, as well as a field that sets the expiration date, time, or event (such as expiration upon reading). These fields can be in the form of flags that are toggled on or off by the message origination software, or may include more detailed control information, such as provision for enabling forwarding upon entry of a password or fulfilling of designated conditions, and as indicated above may also be in the form of IDPs, SMTP service extensions, or any other portion of the electronic mail object that can be parsed by the central server and that will not affect the basic routing of the message to the central server 1.

Although the communications link from the origination software to the server is a standard electronic mail communications channel, streaming of the message from the central server 1 to the recipient's computer 5 is carried out through a channel established by the recipient's Internet browser, i.e., through a standard http (hypertext transfer protocol) connection, rather than through an SMTP or IMAP connection. The viewer applet may thus be implemented as a Internet browser plug-in utilizing a technology such as Active-X, an executable program that works within the Internet browser in the manner, for example, of Adobe Acrobat™, a Java applet with native file level BIOS access, or an extension to an operating system such as Microsoft Windows NT™ or LINUX.

If a viewer applet 4 has not already been installed on the recipient's computer, it may be delivered as a self executing attachment to a standard electronic mail notice from the server 1. The notice indicates that sender-controlled electronic mail has been received and that, to view the message, the sender must open the attachment and follow the directions provided by the applet installation program. In addition, the viewer applet may be saved to a magnetic disk or other portable storage medium 6 so that e-mail can be viewed from remote locations, or the viewer applet may be protected by hardware such as a smartcard.

In order to encrypt the message in a form that can only be read by the viewer applet, some sort of key exchange between the viewer applet 4 and the server 1 is necessary. In the preferred embodiment of the invention, this is accomplished by having the viewer applet generate a private/public key pair and sending the public key to the server so that the server can encrypt the message by the public key of the recipient's viewer applet, the encrypted message therefore being readable only by the viewer using the viewer's private key. A new public private key pair could be generated for each session, or the public key of the recipient could be stored by the server for retrieval each time a message addressed to the recipient is received. While generation of the public keys can be achieved by a variety of known methods, one possible method is to generate the public key based on the variation of times between a user's key strokes, which is known to be a true random number, thereby ensuring the uniqueness of encryption keys for each applet.

Alternatively, instead of using a public key generated by the recipient to protect the message, those skilled in the art will appreciate that it is also possible to include the necessary key in the applet itself prior to downloading, in which case the decryption key could be a shared secret key, or to mutually generate a session key during a handshaking procedure in which exchange of portions of the session key are transferred using a secret key that has previously been transferred to the viewer applet. Other encryption or message protection methods such as chaffing could also be used and the invention is not intended to be limited to any particular encryption method.

As indicated above, delivery of the message from the message origination software 2 to the server 1 is preferably via a standard electronic mail connection. Even though encryption of the message by message origination software 2 will not normally affect handling of the message by the recipient, since the message will be encrypted by the central server 1 before delivery to the recipient, the message is nevertheless preferably also encrypted before sending to the central electronic mail server 1 to ensure that the message will not be intercepted and copied during transit. Again, the invention is not intended to be limited to a particular encryption method, although in the preferred embodiment public key encryption is used.

When encryption is used to protect the message during transit to the central server 1, the public key used to encrypt the original message can either be the public key of the server, in which case the message must be decrypted and re-encrypted by the server prior to deliver, or the public key used to decrypt the message can be the public key of the recipient, in which case the electronic mail server would not need to decrypt the message before streaming it to the recipient's viewer applet. Of course, the original message can be initially encrypted in a form that cannot be decrypted by the server, and then further encrypted by the public key of the server, so that even if the server decrypts and re-encrypts the initially encrypted message, it will still be unreadable by anyone but the intended recipient.

Figure 3:
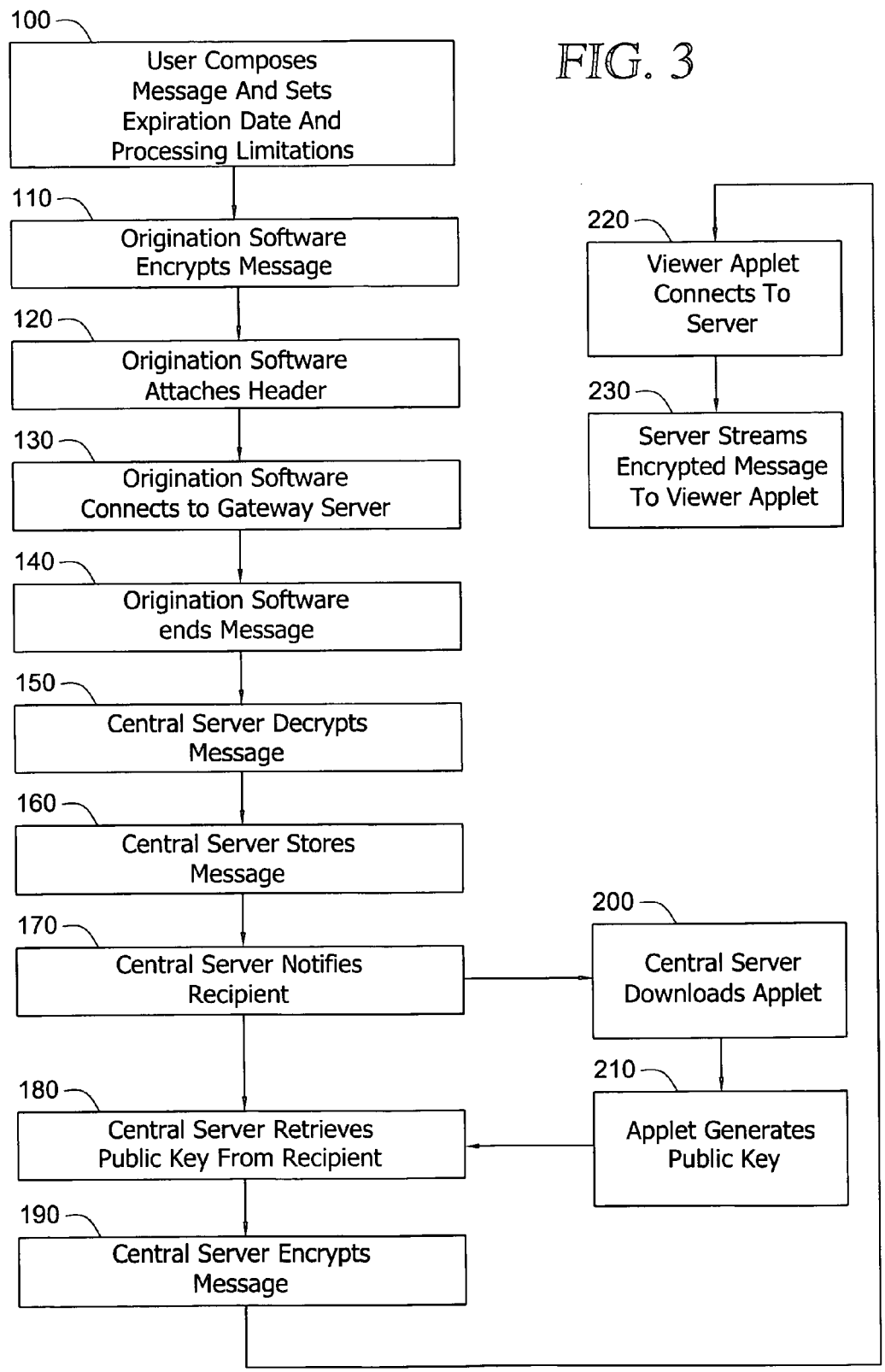
FIG. 3 is a flowchart of a method corresponding to the electronic mail system of FIG. 1.

As shown in FIG. 3, the method of the preferred system embodiment illustrated in FIG. 1 begins with the composition by the originator of an electronic mail message, and designation of an expiration date and other handling or processing limitations (step 100). The originator software then encrypts the message using the public key of the central mail server or possibly the public key of the recipient (step 110), and creates an electronic mail object by attaching a header containing routing information, the expiration date, and other handling or processing instructions using an appropriate format (step 120).

In the case of the SMTP transmission, the originator software opens a connection to a gateway server (step 130). After the gateway server responds with a welcoming message, the message origination software sends a MAIL command which includes the sender identifier and, optionally a service extension or mail parameters, followed by an RCPT command, which identifies the recipient as the central mail server (step 140). In order to simplify use of the message origination software, it is preferable that the user of the message origination software be able to enter the recipient's normal electronic mail address even if the domain name is not the same as that of the central server, with the message origination software being arranged to substitute the central server's address in the RCPT command and to insert the ultimate recipient's address in the header. In this respect, the central server functions as a proxy server whose operation is transparent to the sender.

Upon delivery of the encrypted message, if the message has been encrypted with the recipient's public key, then it is not necessary for the server to decrypt the message, but if the message has been encrypted by the message origination software 2 with the server's public key, the central server decrypts and parses the message for control information (step 150). In either case, the server then stores the message (step 160) and notifies the intended recipient that a message has been received (step 170).

If the message has no expiration date or other access or processing limitations, the message may optionally be sent directly to the subscriber in the manner of a conventional electronic mail message, but if the message has an expiration date and other access or processing limitations, and a viewer has been installed, the public key of the recipient is retrieved (step 180) and the message is encrypted by the public key generated by the recipient's viewer applet 4 (step 190). If a viewer has not already been installed, then the additional steps of installing the viewer applet on the recipient's computer (step 200) and generating a public key (step 210) must be performed.

When viewing of the message is desired by the recipient and the message has not expired, the viewer applet 4 establishes a connection to the central server 1 (step 220) and the central server 1 streams the encrypted message to the viewer (step 230), subject to any use or handling limitations. Streaming may be carried out using the TCP/IP stack included with the recipient's browser software, or a corresponding stack included in the viewer applet.

Finally, at the pre-selected expiration date or time, or upon occurrence of an event such as reading of the message or failure of a recipient to check-in with a security agency and provide proper identification, the message is deleted from storage (step 240), thus completing the method of the first preferred embodiment of the invention. Depending on the operating system used by the server, deletion might require special procedures such as triple erasure in the case of a Windows 95™ or Windows NT™ operating system and, in addition, the system of the preferred embodiment can provide for notification of the message originator upon successful expiration of the message together with, or in addition to, a report on the life history of the message such as a description of who received the message, who opened it, to whom it was forwarded, who modified it, who printed it out, and the dates and times when reception, forwarding, modification, printing and so forth occurred.

The user interfaces for the message origination software and viewer applet are designed to be similar to that of a conventional electronic mail program. Preferably, the viewer and origination software are combined into a single program, although certain features of the message origination software, such as the expiration date and ability to insert processing or handling controls, may be kept inactive upon initial download until the software is registered or a subscription fee is paid, or activated only for a trial period. This combined software package can include all of the functionality of a conventional electronic mail or messaging program, such as Microsoft Outlook Express™, Corel Central™, Netscape Messenger™, or Lotus Notes™, including the ability to create and receive non-encrypted electronic mail messages.

Figure 4:
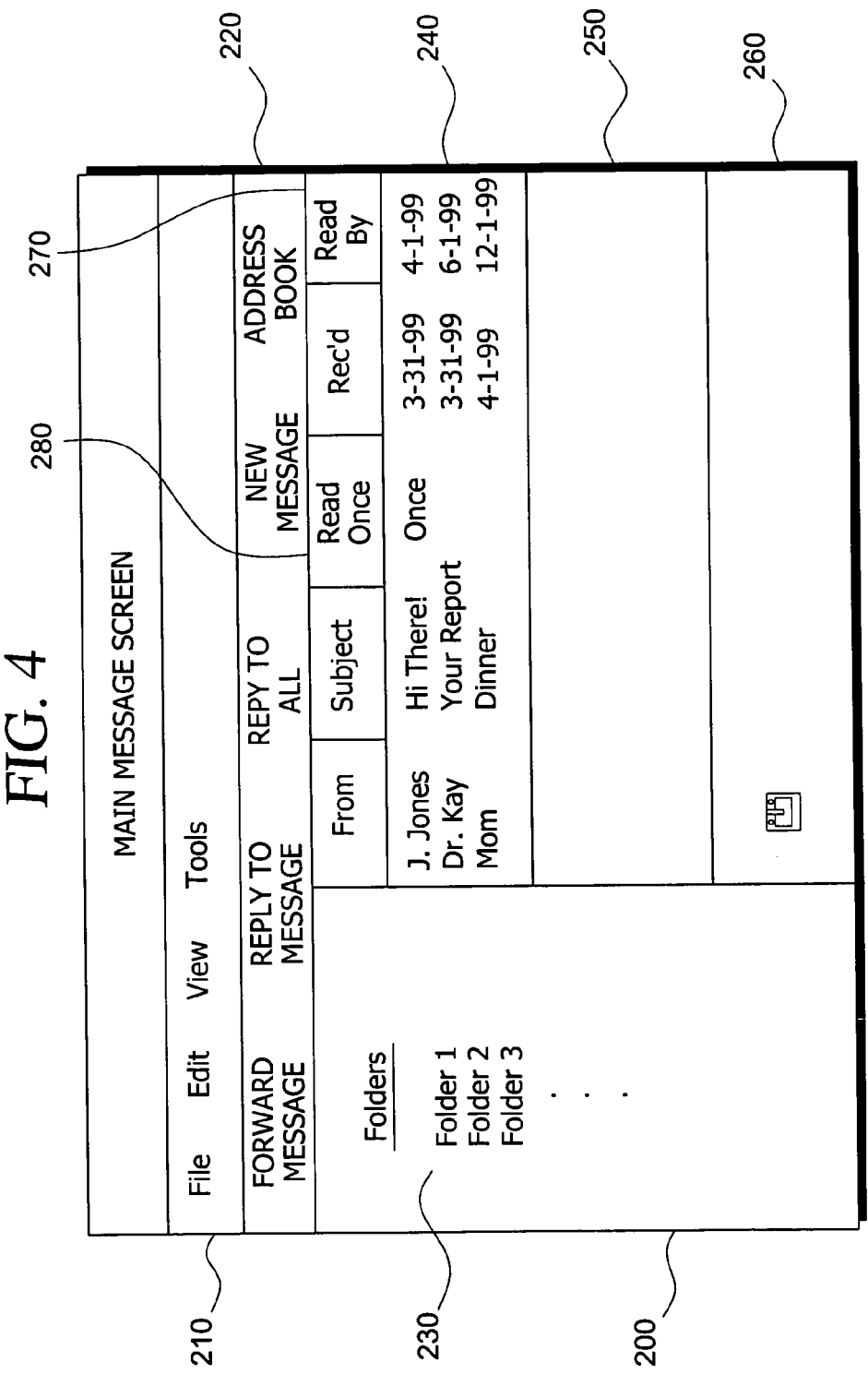
FIG. 4 shows a main message screen for software implementing the method of FIG. 3.

In particular, as illustrated in FIG. 4, the combined viewer and origination software user interface may include a main message screen 200, menus 210, and/or function bars 220 to manage or enable use of such features as electronic mail receiving, filing, editing, and forwarding, as well as a folder display window 230, a file listing window 240, a file viewing window, and an attachments window 260, all of which resemble those of the conventional electronic mail client. According to the principles of the invention, when a message is received with a flag in the header indicating that a function, such as the forwarding function, is disabled, the corresponding button or menu item is also disabled and the display screen is modified to indicate in conventional fashion that the button or menu item is disabled. In addition, the main message screen may provide an indication 270 of the expiration date of the received message, or an indication 280 of other limitations, such as a read once limitation.

Those skilled in the art will appreciate that the message and filing functions provided on the main message screen actually involve manipulation of messages that exist, in the preferred embodiment of the invention, only on the central server 1. In this respect, the system of this preferred embodiment works in the same manner as an IMAP mail server, with the addition of expiration date and other use limitations. However, in the case of new message creation, or if the content of a received message is editable, text editing functions can be performed locally.

Figure 5:
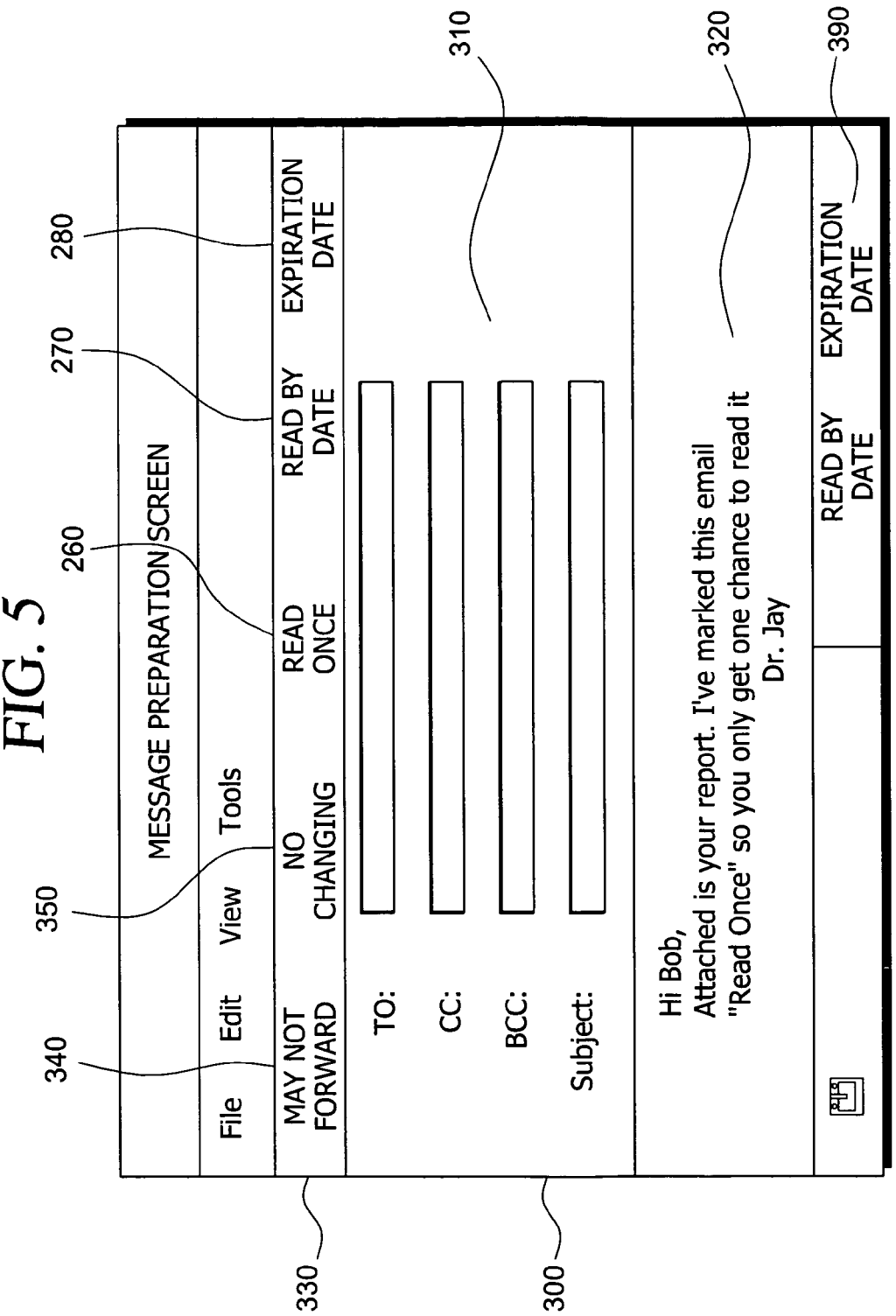
FIG. 5 shows a message preparation screen for software implementing the method of FIG. 3.

An example of a message preparation or creation screen 300 is illustrated in FIG. 5. This screen is presented upon selection of one of the "Reply," "Forward," or "New" message buttons of screen 200, and includes conventional boxes 310,320 for respectively entering addresses and text. In addition, the message creation screen 300 includes buttons 320 that enable the user to cause the message origination software to insert into the header flags to activate use of processing limitations. Buttons 330 include, by way of example, a button 340 that limits forwarding, a button 350 that prevents editing by the recipient, a button 360 that permits the message to be read once, a read-by date button 370, and an expiration date button 380. When any of the latter three buttons is pressed, the message originator is prompted for a date, which is then inserted into the message header and may appear in a confirmation window 390. The read-by date differs from the expiration date in that the message will immediately be expunged after reading, or expunged on the desired date even if the message has not been read, whereas the expiration date button permits the message to be read as many times as desired before the expiration date.

Figure 6:
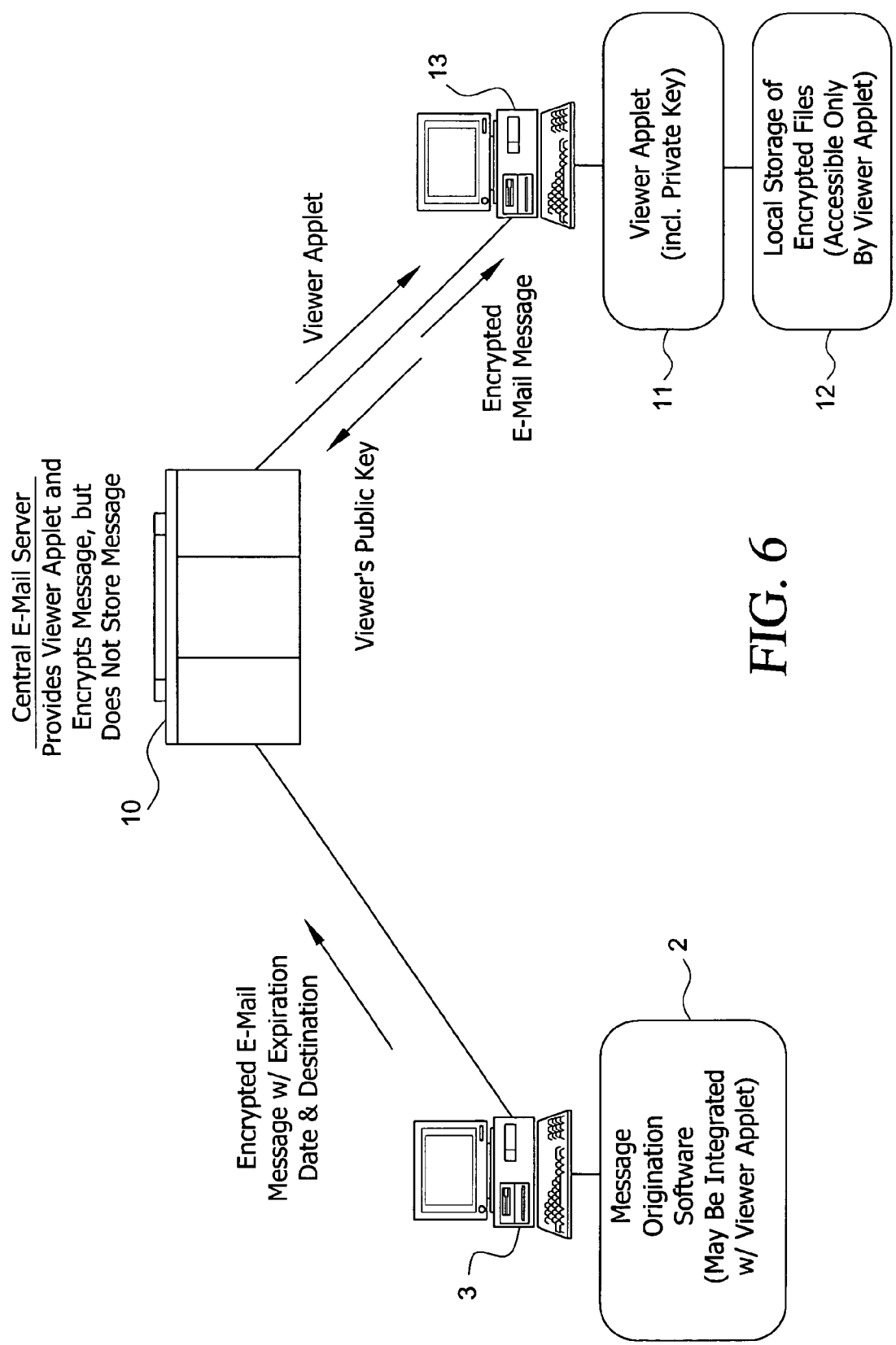
FIG. 6 is a schematic view of a variation of the electronic mail system of FIG. 1.

While the first preferred embodiment of the invention represents an especially straightforward way of limiting access and handling of electronic mail messages by storing the messages on the server and streaming them to the viewer applet, it is in principle possible to create a local store for the files while retaining access control by storing the files in encrypted form on the recipient's computer, as illustrated in FIG. 6, eliminating the need for intervention by a central server, which instead can be used solely for auditing, billing, or tracking functions. In this variation of the first preferred embodiment of the invention, the primary role played by the central server 10 is to extract the recipient's address from the message header, if the recipient is not already using the domain name of the server, and to supply the viewer applet 11, which creates a local storage area 12 on the recipient's computer for encrypted files. Since the files are encrypted, viewing is effectively prevented unless the viewer is used, and thus control is still retained by the viewer program.

Figure 7:
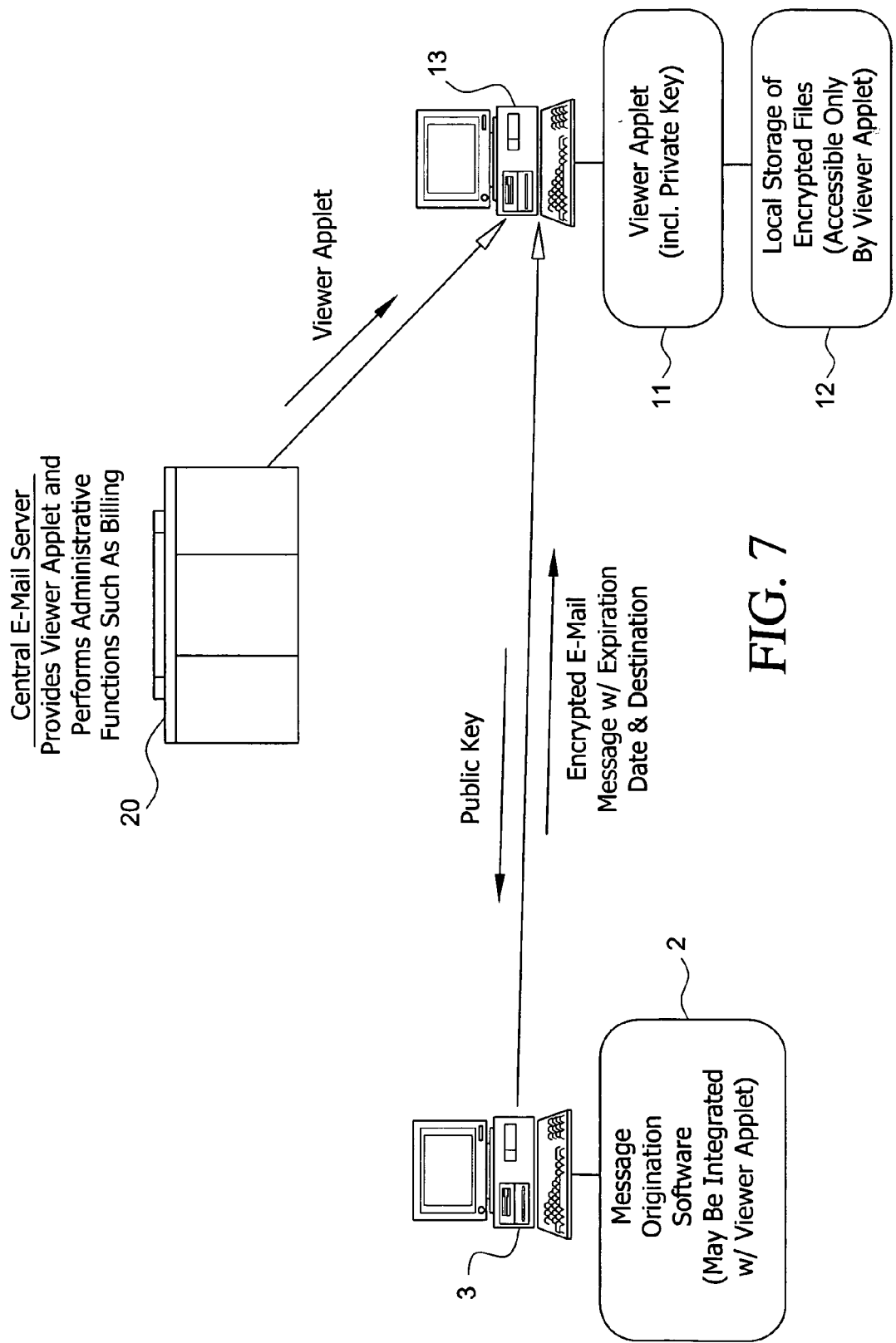
FIG. 7 is a schematic view of a further variation of the electronic mail system of FIG. 1.

In a still further variation of the first preferred embodiment of the invention, illustrated in FIG. 7, the principle of local storage of the encrypted message is extended still further by eliminating the encryption function of the central electronic mail server 20, and instead having the message origination software 2 encrypt the message with the recipient's public key. In that case, server 20 serves only to supply the viewer applet.

Those skilled in the art will note that each of the variations shown in FIGS. 6 and 7 can use the same message origination software and viewer applet. This is because the only difference is involves whether the server or the recipient is initially addressed by the message origination software, and therefore whether the server's or the recipient's public key is used for encryption.

Figure 8:
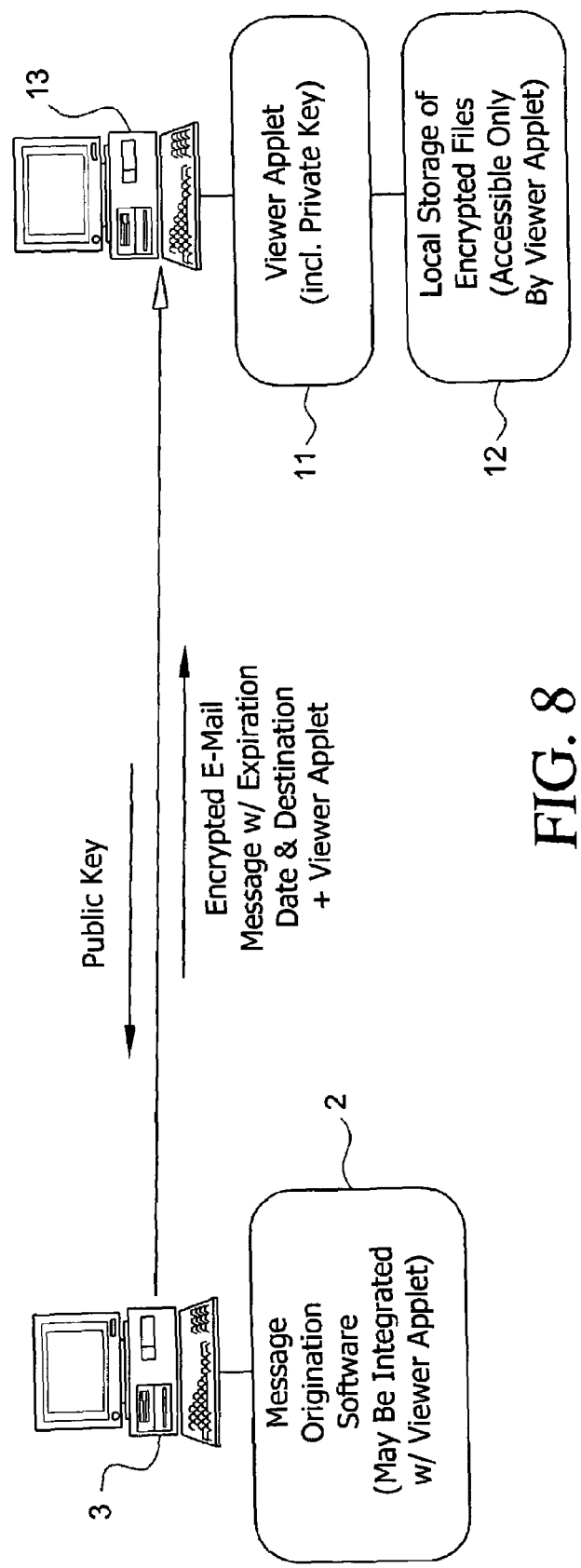
FIG. 8 is a schematic view of an electronic mail system constructed in accordance with the principles of a second preferred embodiment of the invention.

Finally, in the second preferred embodiment of the invention, as illustrated in FIG. 8, the viewer applet is itself attached to the encrypted electronic mail message, and the central server is eliminated entirely. As in the first preferred embodiment, the recipient of the message may be given the option of installing or refusing the viewer applet in order to view the message. Alternatively, however, the viewer applet can be made self-executing since there is no need to register with the server, permitting the viewer applet to be spread like a benign virus each time a recipient uses the applet to send or forward a message.

Those skilled in the art will appreciate that this decentralization of the point of control of the distribution of electronic mail may have applicability to the distribution in general of electronic information transmitted via a decentralized computer network connecting the originator with a recipient through a clearing-house (the central server of the first preferred embodiment), or even without the intervention of a clearing house (attachment of the viewer applet to the electronic mail message).

Figure 9:
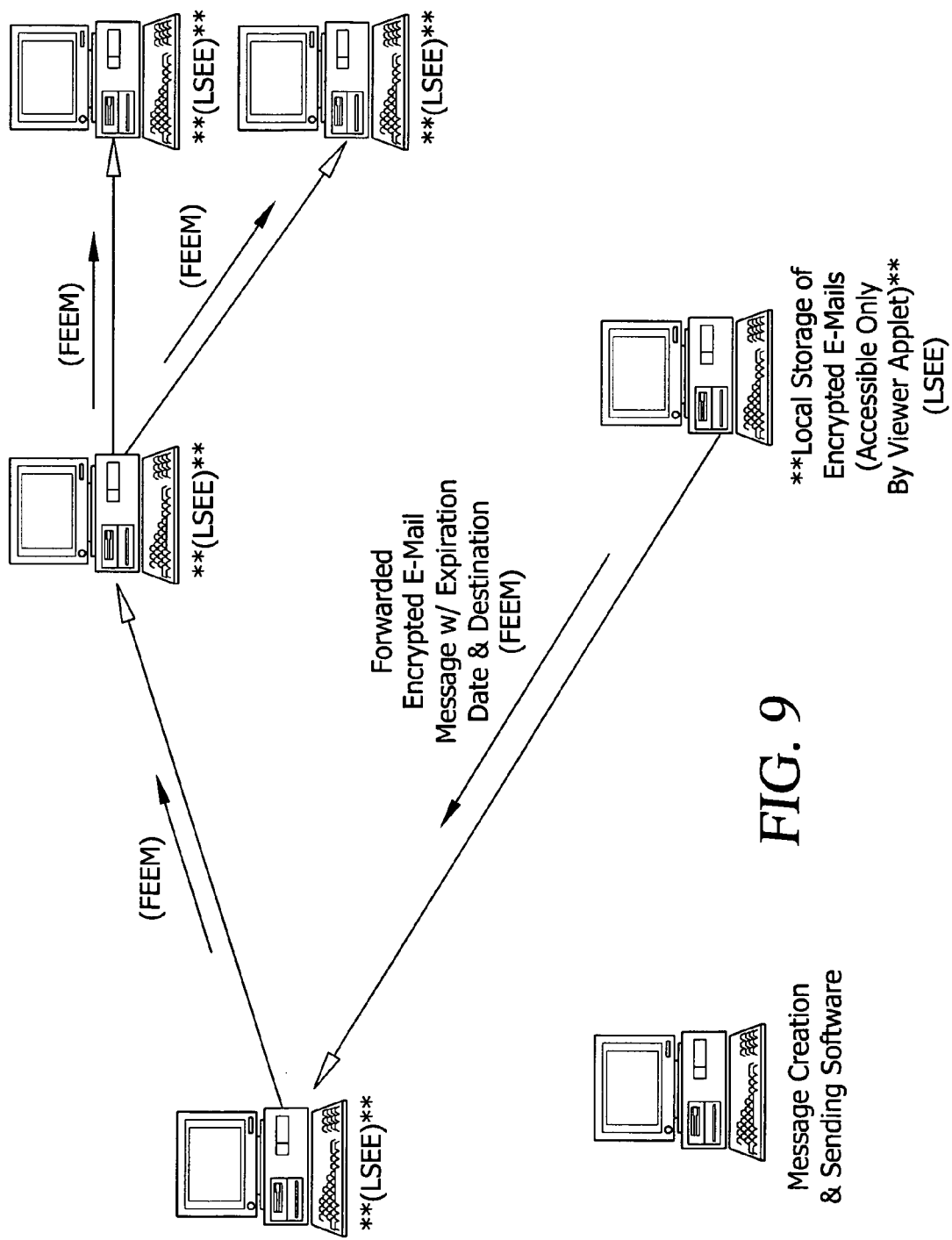
FIGS. 9–11 are schematic views which illustrate the effect obtained by the system and method of the invention.
Figure 10:
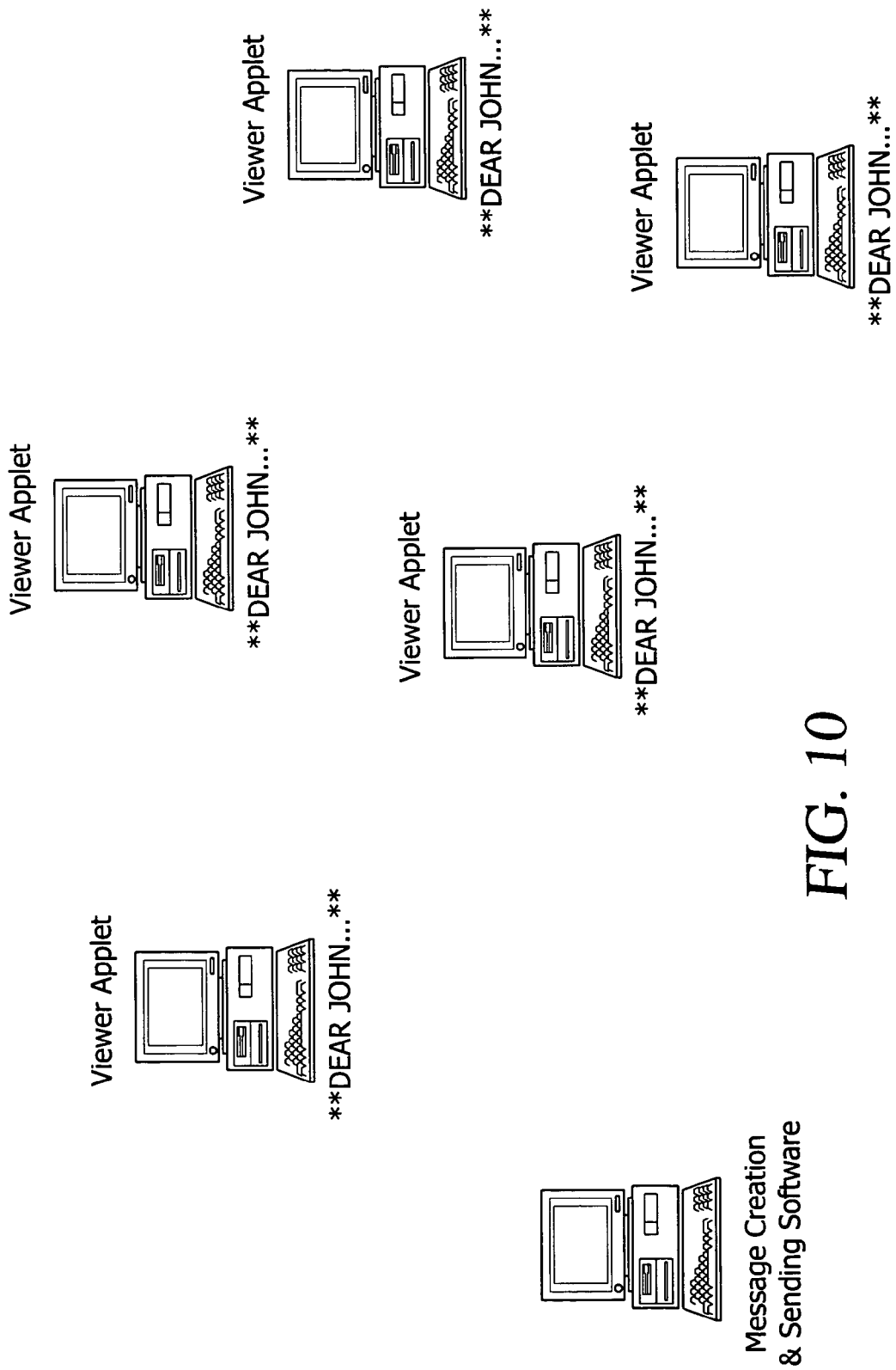
Figure 11:
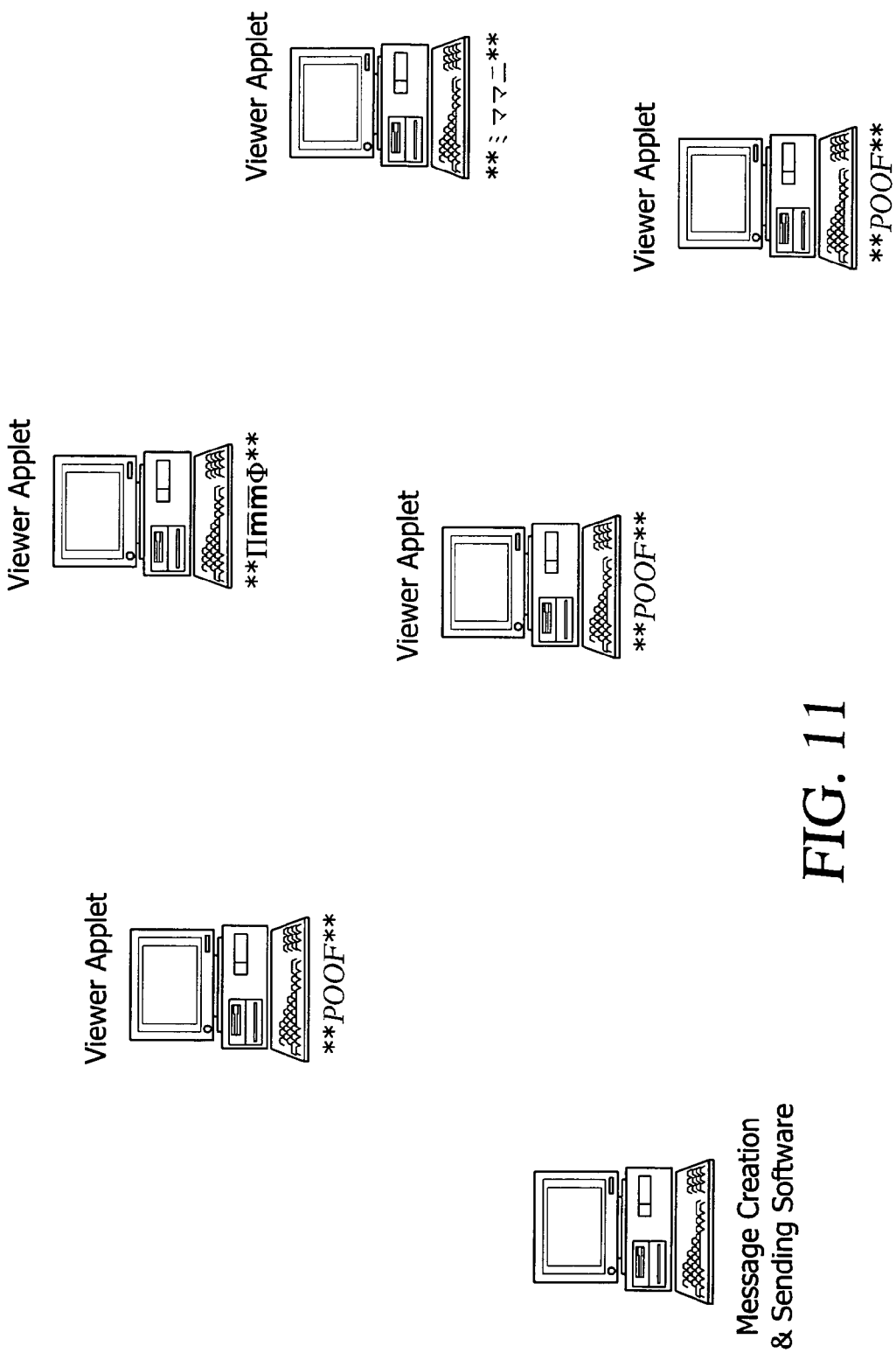

FIGS. 9–11 illustrate the dramatic results achieved by the invention. As shown in FIG. 9, a message is being forwarded to numerous different computers situated in a widely dispersed locations. Although depiction of central electronic mail servers has been deleted from this drawing, it will be appreciated that the message and viewer applet may be forwarded utilizing either of the two principle embodiments of the invention, any of the variations thereof, or combinations of the embodiments. In the header of the original message, and therefore of the forwarded messages, are flags permitting forwarding, prohibiting alteration, and most importantly setting an expiration date for the message. At some point before the expiration date, as depicted in FIG. 10, the message has been spread around the world and resides in encrypted form either on one or more central servers or in local protected storage. However, on the expiration date, as depicted in FIG. 11, the message is completely expunged from all storage areas (assuming that the originator has not designated selected addresses as exceptions from the expiration requirement), effectively wiping the message off the face of the earth. No existing electronic mail system has this capability.

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention.

For example, although the present invention is particularly applicable to electronic mail systems, the principles of the first preferred embodiment of the present invention may also be applicable to other types of systems and methods for providing an originator of electronic information with control over a recipient's distribution of the electronic information transmitted via a decentralized computer network connecting the originator with a recipient through a clearing-house. According to the broadest principles of the first preferred embodiment, the originator of the electronic information assigns control information to the electronic information, the control information being at least one of expiration criteria, distribution criteria, or operation criteria, and the system optionally stores the control information in a first database in communication with the clearing-house, with the clearing-house optionally being accessible to the originator and capable of sending the control information to the recipient. After receiving a control response from the recipient, the control response being generated either automatically or upon input by the user, the system may send a control module in the form of an application or signal from the clearing-house to the recipient based on the control response and the control information. After the control module is installed at the recipient device, the system may send the electronic information to the control module, which may in turn automatically restrict distribution of the electronic information according to the control information. The recipient device can then play the electronic information according to the control information.

Consequently, those skilled in the art will appreciate that, in view of the numerous modifications and variations that can be made without departing from the above principles, the scope of the invention should not be limited by the above description, but rather should be interpreted solely in accordance with the appended claims.

We claim:

1. An electronic mail system, comprising:
   a first computer on which is installed message origination software and which is connected to a network capable of carrying an electronic mail message;
   at least one recipient computer also connected to said network; and
   a viewer applet,
   wherein said message origination software is arranged to permit an originator of the electronic mail message to select a date, time, or event, the occurrence of which will cause said electronic mail message and all designated incarnations thereof to expire,
   wherein said date, time, or event is attached to the electronic mail message by the message origination software prior to transmission over said network,
   wherein said electronic mail message is encrypted so that it may only be viewed by a recipient using said viewer applet upon installation of said viewer applet on said at least one recipient computer, and
   wherein said viewer applet is arranged to decrypt said electronic mail message to permit viewing of said electronic mail message before the occurrence of the date, time, or event selected by said originator of the electronic mail message, and to prevent decryption and viewing of said encrypted electronic mail message by said recipient after the occurrence of the date, time, or event selected by said originator of the electronic mail message, and wherein:
   since said electronic mail message can only be viewed using the viewer applet because only the viewer applet can decrypt said electronic mail message, and
   since the viewer applet prevents decryption and viewing of the electronic mail message after the occurrence of the date, time, or event,
   said electronic mail system positively prevents all designated incarnations of the electronic mail message from being viewed after the occurrence of the date, time, or event.

2. An electronic mail system as claimed in claim 1, further comprising a central electronic mail server connected to said network, said message origination software being arranged to send said electronic mail message to said electronic mail server, said electronic mail server being arranged to store said electronic mail message and, upon request by the recipient, encrypt said electronic mail message and stream it to said viewer applet, and said viewer applet being arranged to decrypt said message as it is streamed, so as to display said message.

3. An electronic mail system as claimed in claim 2, wherein said message is encrypted by said central mail server using a public key generated by the viewer applet, said viewer applet being arranged to generate said public key and also a corresponding private key used to decrypt said message.

4. An electronic mail system as claimed in claim 2, wherein said viewer applet is further arranged to permit a user to request forwarding of said electronic mail message stored on said central mail server to a second recipient computer, said central mail server being arranged to encrypt and stream said message to a copy of the viewer applet installed on said second recipient computer and, prior to streaming said message to said second recipient computer, download said viewer applet to said second recipient computer if the viewer applet is not already installed on the second recipient computer.

5. An electronic mail system as claimed in claim 4, wherein said message is encrypted by said central mail server using respective public keys generated by the viewer applet installed on the recipient computer and the copy of the viewer applet installed on the second recipient computer, said viewer applet and said copy of the viewer applet being arranged to generate said respective public keys and also corresponding private keys used to decrypt said message.

6. An electronic mail system as claimed in claim 4, wherein upon the occurrence of said date, time, or event, said central electronic mail server erases said electronic mail message and, because said electronic mail message is stored only on the central electronic mail server, terminates the existence of the electronic mail message anywhere in this universe.

7. An electronic mail system as claimed in claim 2, wherein upon the occurrence of said date, time, or event, said central electronic mail server erases said electronic mail message and, because said electronic mail message is stored only on the central electronic mail server, terminates the existence of the electronic mail message anywhere in this universe.

8. An electronic mail system as claimed in claim 2, wherein said message origination software is arranged to permit entry of processing and handling limitations, and wherein said processing and handling limitations are attached to said electronic mail message before transmission over said network.

9. An electronic mail system as claimed in claim 8, wherein said processing and handling limitations are implemented by said central server in cooperation with said viewer applet.

10. An electronic mail system as claimed in claim 1, wherein said message is encrypted by a central mail server before transmission to said recipient computer.

11. An electronic mail system as claimed in claim 10, wherein said message is encrypted by said central mail server using a public key generated by the viewer applet, said viewer applet being arranged to generate said public key and also a corresponding private key used to decrypt said message.

12. An electronic mail system as claimed in claim 1, wherein said message is encrypted by said message origination software using a public key generated by the viewer applet, said viewer applet being arranged to generate said public key and also a corresponding private key used to decrypt said message.

13. An electronic mail system as claimed in claim 1, wherein said viewer applet stores said electronic mail message in encrypted form on said recipient computer and, upon the occurrence of said date, time, or event, erases said electronic mail message.

14. An electronic mail system as claimed in claim 13, wherein said viewer applet is arranged to forward said electronic mail message in encrypted form to a second recipient computer, wherein a copy of said viewer applet is installed on said second recipient computer, and wherein upon the occurrence of said time, date, or event, said copy of the viewer applet erases said electronic mail message.

15. An electronic mail system as claimed in claim 14, wherein said viewer applet is forwarded to said second recipient computer as an attachment to said electronic mail message, thereby causing said system to be self-propagating.

16. An electronic mail system as claimed in claim 1, wherein said message origination software is arranged to permit entry of processing and handling limitations, and wherein said processing and handling limitations are attached to said electronic mail message before transmission over said network.

17. An electronic mail system as claimed in claim 16, wherein said processing and handling limitations are implemented by said viewer applet.

18. A method of controlling an electronic mail message transmitted over a network, comprising the steps of:
    before transmission of the electronic mail message over the network, attaching to the message a date, time, or event, the occurrence of which will cause said electronic mail message and all designated incarnations thereof to expire;
    encrypting said electronic mail message so that it can only be viewed by using a viewer applet capable of decrypting the message and installed on a recipient computer, said viewer applet preventing decryption of said electronic mail message unless controls set by a sender of the electronic mail message are implemented, said viewer applet thereby preventing viewing of said message after the occurrence of said time, date, or event;
    initially transmitting said electronic mail message over said network to a central electronic mail server;
    storing said electronic mail message at said electronic mail server; and,
    upon request by the recipient, encrypting said electronic mail message, streaming the encrypted electronic mail message to said viewer applet, and decrypting said electronic mail message as it is received by the viewer applet so as to display said message without storing it at said recipient computer.

19. A method of controlling an electronic mail message as claimed in claim 18, wherein said step of encrypting said electronic mail message is carried out by said central electronic mail server using a public key generated by the viewer applet, said viewer applet being arranged to generate said public key and also a corresponding private key used to decrypt said message.

20. A method of controlling an electronic mail message as claimed in claim 19, further comprising the steps of causing said viewer applet to request forwarding of said electronic mail message stored on said central mail server to a second recipient computer, encrypting said electronic mail message using a public key of a copy of said viewer applet installed on said second recipient computer, and streaming said electronic message to said second recipient computer.

21. A method of controlling an electronic mail message as claimed in claim 20, wherein upon the occurrence of said date, time, or event, said central electronic mail server erases said electronic mail message and, because said electronic mail message is stored only on the central electronic mail server, terminates the existence of the electronic mail message anywhere in this universe.

22. A method of controlling an electronic mail message as claimed in claim 18, wherein upon the occurrence of said date, time, or event, said central electronic mail server erases said electronic mail message and, because said electronic mail message is stored only on the central electronic mail server, terminates the existence of the electronic mail message anywhere in this universe.

23. A method of controlling an electronic mail message as claimed in claim 18, further comprising the step of attaching processing and handling limitations to said electronic mail message before transmission over said network.

24. A method of controlling an electronic mail message as claimed in claim 23, further comprising the step of causing said central electronic mail server and viewer applet to implement said processing and handling limitations.

25. A method of controlling an electronic mail message as claimed in claim 18, wherein the step of transmitting said electronic mail message over said network comprises the step of transmitting said message to a central electronic mail server and causing said central electronic mail server to encrypt said message before transmitting it to said recipient computer.

26. A method of controlling an electronic mail message as claimed in claim 25, further comprising the steps of causing said viewer applet to generate a public key and a corresponding private key and transmitting said public key to said central server for use in encrypting said message.

27. A method of controlling an electronic mail message transmitted over a network, comprising the steps of:
    before transmission of the electronic mail message over the network, attaching to the message a date, time, or event, the occurrence of which will cause said electronic mail message and all designated incarnations thereof to expire;
    encrypting said electronic mail message using a public key associated with a private key held by the viewer applet to decrypt said message so that the electronic mail message can only be viewed by using a viewer applet capable of decrypting the message and installed on a recipient computer, said viewer applet preventing decryption of said electronic mail message unless controls set by a sender of the electronic mail message are implemented, said viewer applet thereby preventing viewing of said message after the occurrence of said time, date, or event;

causing said viewer applet to store said electronic mail message in encrypted form on said recipient computer and, upon the occurrence of said date, time, or event, erase said electronic mail message;

causing said viewer applet to forward said electronic mail message in encrypted form to a second recipient computer; and upon the occurrence of said time, date, or event, causing a copy of said viewer applet installed on said second recipient computer to erase said electronic mail message.

28. A method of controlling an electronic mail message as claimed in claim 27, further comprising the step of forwarding said copy of the viewer applet to said second recipient computer as an attachment to said electronic mail message, thereby causing said system to be self-propagating.

29. A method of controlling an electronic mail message as claimed in claim 18, further comprising the step of attaching flags indicating processing and handling limitations to said electronic mail message before transmission over said network.

30. A method of controlling an electronic mail message as claimed in claim 29, further comprising the step of causing said viewer applet to implement said processing and handling limitations.

31. An electronic mail system, comprising:
a first computer on which is installed message origination software and which is connected to a network capable of carrying an electronic mail message, said message origination software being arranged to enable an originator of the message to attach message processing limitations to the message before it is sent;
at least one recipient computer also connected to said network;
a viewer applet arranged to cooperate with said central server to implement said processing limitations; and
a central electronic mail server connected to said network, said message origination software being arranged to send said electronic mail message to said electronic mail server, said electronic mail server being arranged to store said electronic mail message and, upon request by the recipient, encrypt said electronic mail message and stream it to said viewer applet, and said viewer applet being arranged to decrypt said viewer applet as it is streamed so as to display said message,
wherein said viewer applet and central electronic mail server cooperate to prevent decryption and viewing of said encrypted electronic mail message by said recipient unless said processing limitations are implemented, and
wherein:
because said message can only be viewed by having said viewer applet decrypt said message as it streamed to the viewer applet by the central electronic mail server, so that a recipient must use said viewer applet to view said message, and
because said viewer applet implements said processing limitations,
said message cannot be viewed without said processing limitations.

32. An electronic mail system as claimed in claim 31, wherein said message is encrypted by said central mail server using a public key generated by the viewer applet, said viewer applet being arranged to generate said public key and also a corresponding private key used to decrypt said message.

33. An electronic mail system as claimed in claim 31, wherein said viewer applet is further arranged to permit a user to request forwarding of said electronic mail message stored on said central mail server to a second recipient computer, said central mail server being arranged to encrypt and stream said message to a copy of the viewer applet installed on said second recipient computer and, prior to streaming said message to said second recipient computer, download said viewer applet to said second recipient computer if the viewer applet is not already installed on the second recipient computer.

34. An electronic mail system as claimed in claim 33, wherein said message is encrypted by said central mail server using respective public keys generated by the viewer applet installed on the recipient computer and the copy of the viewer applet installed on the second recipient computer, said viewer applet and said copy of the viewer applet being arranged to generate said respective public keys and also corresponding private keys used to decrypt said message.

35. A method of controlling an electronic mail message transmitted over a network, comprising the steps of:
before transmission of the electronic mail message over the network, attaching limitations on processing and handling of the electronic mail message by a recipient;
initially transmitting said electronic mail message over said network to a central electronic mail server;
storing said electronic mail message at said electronic mail server;
upon request by the recipient, encrypting said electronic mail message, streaming the encrypted electronic mail message to a viewer applet installed on said recipient computer, and decrypting said electronic mail message as it is received by the viewer applet so as to display said message without storing it at said recipient computer; and
preventing said decrypting of the electronic mail message and viewing of the message by the recipient unless said processing limitations attached to the message before transmission of the message are implemented,
wherein:
because said message can only be viewed by having said viewer applet decrypt said message as it streamed to the viewer applet by the central electronic mail server, so that a recipient must use said viewer applet to view said message, and
because said viewer applet implements said processing limitations,
said message cannot be viewed without said processing limitations.

36. A method of controlling an electronic mail message as claimed in claim 35, further comprising the steps of encrypting said electronic mail message is carried out by said central electronic mail server using a public key generated by the viewer applet, said viewer applet being arranged to generate said public key and also a corresponding private key used to decrypt said message.

37. A method of controlling an electronic mail message as claimed in claim 35, further comprising the steps of causing said viewer applet to request forwarding of said electronic mail message stored on said central mail server to a second recipient computer, encrypting said electronic mail message using a public key of a copy of said viewer applet installed on said second recipient computer, and streaming said electronic message to said second recipient computer.

38. A computer program for handling electronic mail, comprising:

a mail origination portion arranged to permit the originator to select a date, time, or event, the occurrence of which will cause said message to expire, said computer program being arranged to attach said date, time, or event to said electronic mail message before sending of the electronic mail message; and a viewer applet portion arranged to decrypt said electronic mail message to permit viewing of said electronic mail message before the occurrence of the date, time, or event selected by said originator of the electronic mail message, and to decrypt a received electronic mail message and to permit viewing of the received electronic mail message before a date, time, or event specified by a sender of the received message, wherein said viewer applet is arranged to prevent decryption and viewing of said encrypted electronic mail message by a recipient after the occurrence of the date, time, or event specified by the sender of the electronic mail message, and wherein:

since said electronic mail message can only be viewed using the viewer applet because only the viewer applet can decrypt said electronic mail message, and since the viewer applet prevents decryption and viewing of the electronic mail message after the occurrence of the date, time, or event, said electronic mail system positively prevents all designated incarnations of the electronic mail message from being viewed after the occurrence of the date, time, or event.

39. A computer program as claimed in claim 38, wherein said received electronic mail message is encrypted by a central server and streamed to said viewer applet portion, and wherein said viewer applet portion is arranged to decrypt said message as it is streamed from said central server.

40. A computer program as claimed in claim 38, wherein upon the occurrence of said date, time, or event, said viewer applet portion causes said electronic mail message to be erased.

41. A computer program as claimed in claim 38, wherein said message origination program is arranged to attach a copy of said viewer applet portion to each electronic mail message having a specified expiration date, time, or event.

42. A computer program as claimed in claim 38, wherein said message origination program is further arranged to permit the originator to set handling and processing controls, and wherein said viewer applet portion is arranged to implement handling and processing controls on a received message.

43. A method of distributing applets for viewing electronic files, comprising the steps of:

encrypting the electronic files so that they can only be viewed by the viewer applet;

transmitting the encrypted electronic file from a computer of an originator of the file to a computer of a recipient designated by the originator;

if the computer of the recipient does not have said viewer applet installed thereon, transmitting said viewer applet to the computer of the recipient either before or simultaneously with the transmission of the electronic file, wherein said viewer applet prevents decryption and viewing of said encrypted electronic mail message by said recipient unless message processing limitations specified by the originator of said message are implemented, and wherein:

since said electronic mail message can only be viewed using the viewer applet because only the viewer applet can decrypt said electronic mail message, and since the viewer applet prevents decryption and viewing of the electronic mail message after the occurrence of the date, time, or event, said electronic mail system positively prevents all incarnations of the electronic mail message from being viewed unless said processing limitations are implemented.

44. A method as claimed in claim 43, further comprising the step of notifying the recipient that an encrypted electronic file has been received and that the electronic file can only be viewed upon installation of said viewer applet on the computer of the recipient.

45. A method as claimed in claim 44, wherein the step of notifying the recipient is carried out by a central server, said central server also supplying said viewer applet to said computer of the recipient.

46. A method as claimed in claim 43, wherein the viewer applet is transmitted simultaneously with the electronic file from the computer of the originator to the computer of the recipient.

47. A method as claimed in claim 43, wherein the electronic file is an electronic mail message, and the viewer applet is transmitted as an attachment to the electronic mail message.

\* \* \* \* \*